No. 894,831.
PATENTED AUG. 4, 1908.
G. E. HESSE.
APPARATUS FOR TREATING AND HEATING AIR.
APPLICATION FILED JULY 8, 1905.
3 SHEETS—SHEET 2.
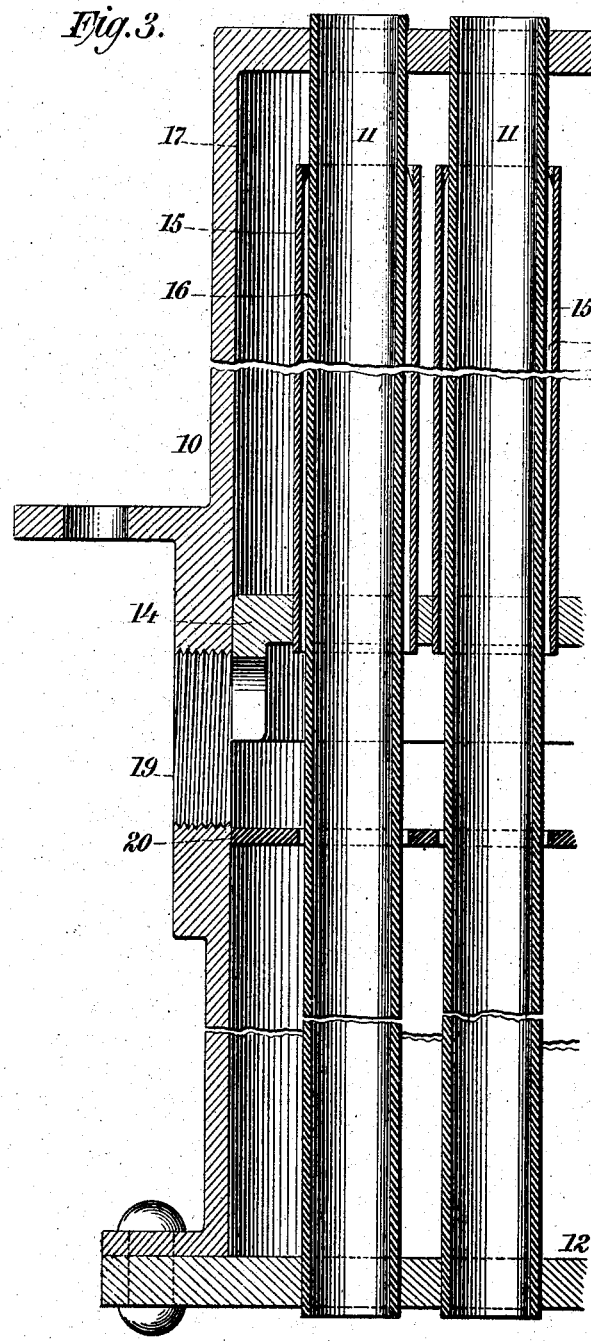
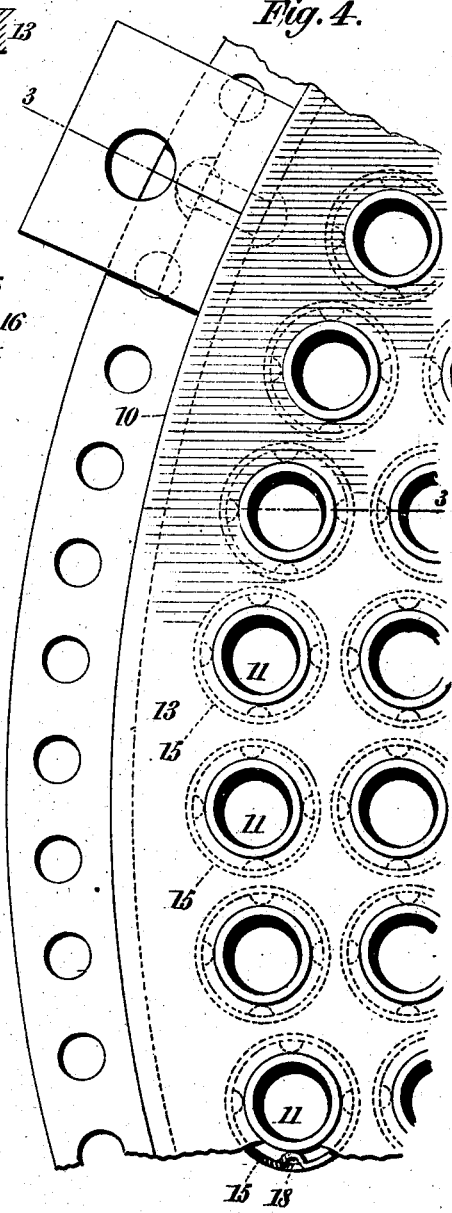
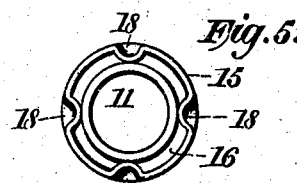
WITNESSES:
Gustave Dieterich
Edwin N. Dieterich
INVENTOR
Gustaf Emil Hesse
BY
Chas. C. Gill
ATTORNEY

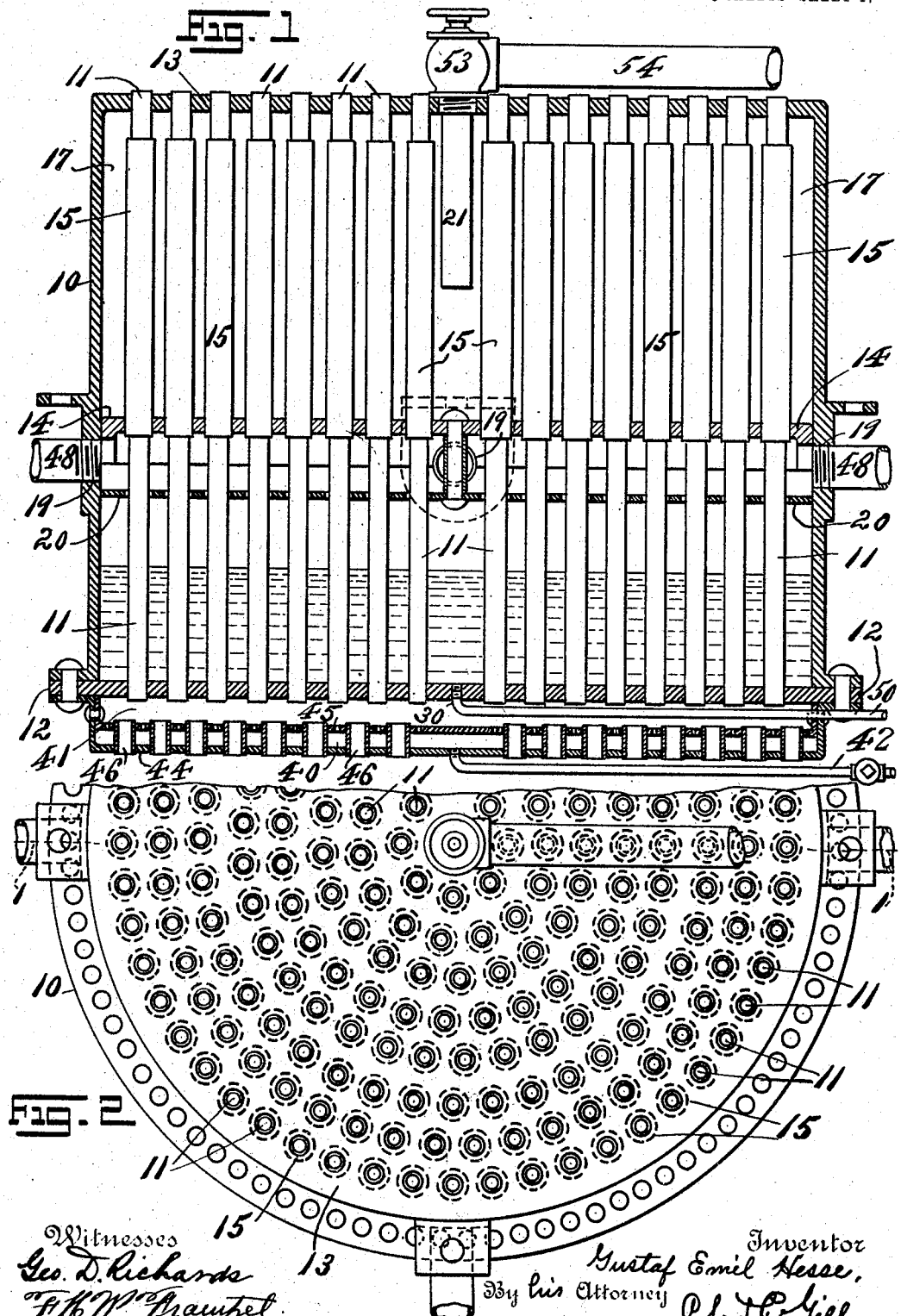

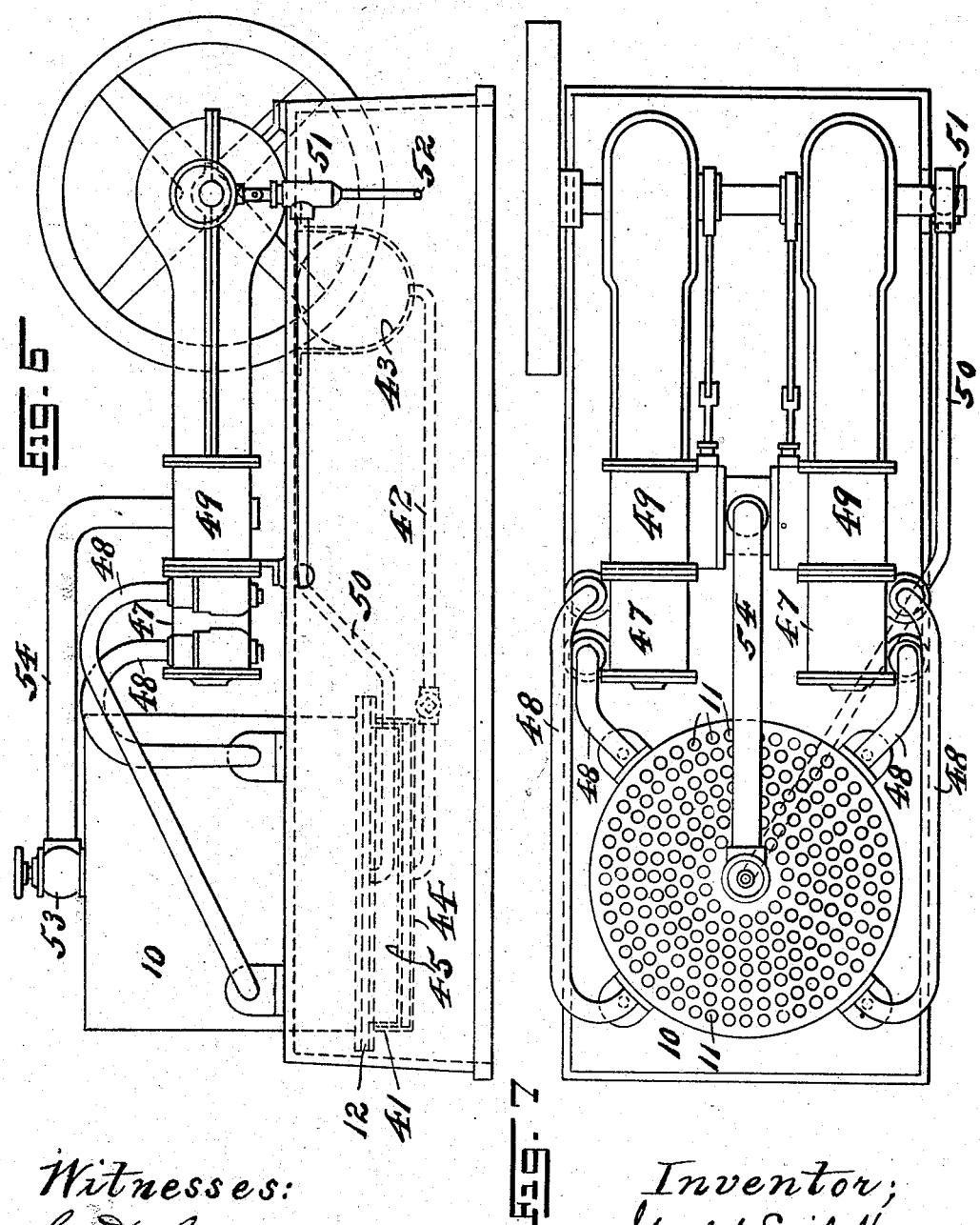

UNITED STATES PATENT OFFICE.

GUSTAF EMIL HESSE, OF BROOKLYN, NEW YORK, ASSIGNOR TO SVEA CALORIC ENGINE COMPANY, OF NEW YORK, N. Y., A CORPORATION OF DELAWARE.

APPARATUS FOR TREATING AND HEATING AIR.

No. 894,831.  Specification of Letters Patent.  Patented Aug. 4, 1908.

Application filed July 8, 1905. Serial No. 268,803.

*To all whom it may concern:*

Be it known that I, GUSTAF EMIL HESSE, a citizen of Sweden, and resident of Brooklyn, in the county of Kings and State of New York, have invented certain new and useful Improvements in Apparatus for Treating and Heating Air, of which the following is a specification.

The invention relates to improvements in apparatus for treating and heating air for power and other purposes, such for illustration, as for use in external combustion engines, the object of the invention being to provide means for so treating and heating the air that it may be used for engines of large powers as well as for engines of smaller size. By means of my invention I am enabled to so thoroughly, evenly and rapidly heat the air that the latter may be used with advantage for large powers.

Dry air is a poor conductor of heat, and in accordance with the methods heretofore devised for heating air, the process was too slow for even a moderate volume, without making the size and weight of engine prohibitive.

The problem solved by my invention is the rapid, uniform and effective heating of the air to economically attain the requisite volume and condition for large powers.

In carrying out my invention I force the air, preferably at several different points, into a heater within which the cool air is not only in many distinct tubular divisions forced to move over the heated surfaces from which it absorbs heat, but by preference is subjected in said heater to the action of steam by which the movement of the air is accelerated in its passage over the heated surfaces and the air has its heat conductivity increased. The air entering the heater, under pressure, is mechanically divided up because of the construction of the heater itself, but when steam is generated in the lower part of the heater and permitted to commingle with and aid in driving the air along, the air becomes enabled to more rapidly absorb the heat from the surfaces over which it is caused to travel.

I present my invention herein as embodied in a heater comprising an upper collecting chamber, a middle cold air chamber, a lower water and steam chamber, a series of inlets for admitting the cold air, under pressure, into said cold air chamber, a series of flues extending vertically through the several chambers of the heater and open at both ends to permit the passage through them of the hot gases and combustion products, and a series of tubes encompassing the upper portions of the heat tubes and open at their lower ends to receive air from the cold air chamber and open at their upper ends to permit the discharge of the heated air into the said collecting chamber, these last mentioned tubes serving to finely divide the cold air or reduce it to a series of thin sheets enveloping the heat tubes and closely confined against the same. The steam from the steam chamber is admitted in limited quantities to the air in the cold air chamber so as to accelerate the movement of the sheets of air over the heated surfaces and to impart to the air a greater degree or condition of heat conductivity, whereby the air is enabled to more readily absorb heat from the surfaces over which it passes.

The invention will be fully understood from the detailed description hereinafter presented, reference being had to the accompanying drawings, in which:

Figure 1 is a central vertical section through a heater constructed in accordance with and embodying the invention; Fig. 2 is a top view, partly broken away, of same; Fig. 3 is an enlarged central vertical section, partly broken away, through a portion of same on the dotted line 3—3 of Fig. 4; Fig. 4 is an enlarged top view, partly broken away, of a portion of same; Fig. 5 is a detached top view of one pair of the tubes forming a part of the heater; Fig. 6 is a side elevation of the heater of my invention shown in complete operative relation with a double-acting engine to be supplied with motive fluid from it, means for forcing air under pressure into the middle or cold air chamber of the heater, means for supplying water to the lower water and steam chamber of same, and a combustion chamber; and Fig. 7 is a top view of same.

In the drawings, 10 designates a cylindrical shell constituting the exterior walls of the heater, and 11 tubes open at both ends and extending vertically through said shell, the lower ends of said tubes being fastened in the lower end 12 of said shell and the upper ends of said tubes being fastened in the upper end or head 13 of said shell. The tubes 11 constitute flues through which heated combustion products will pass, it being intended, as shown, that suitable heating means will be located directly below the shell 10 and that the heated air and combustion products therefrom shall pass upwardly through and heat the tubes or flues 11.

The means for supplying heat to the tubes 11 may be an oil-burner 40 secured within the lower end of a combustion chamber 41 applied to the lower end of the shell 10 and supplied with oil through a pipe 42 from a tank 43, said burner comprising a lower plate 44 and an upper perforated plate 45 and having air-tubes 46 extending through it. There are a large number of the tubes or flues 11 employed and these tubes or flues will preferably be evenly distributed throughout the entire heater. The tubes or flues 11 have no outlet within the chamber of the heater and their purpose is to afford maximum surfaces against which the air may be caused to travel and from which it may absorb the requisite amount of heat.

Within the shell or casing 10 is provided a partition plate 14 through which all of the flues or tubes 11 pass and the apertures in which are greater in diameter than said tubes and receive the lower ends of tubes 15 which encompass the upper portions of the tubes 11 and are open at both their lower and upper ends. Between the inner walls of the tubes 15 and exterior walls of the tubes 11 are formed narrow annular chambers 16, through which the air is compelled to pass, said air entering the lower ends of the tubes 15 and escaping from the upper ends thereof into the collecting chamber 17 of the heater; and the walls of the tubes 15 being in near relation to the walls of the tubes 11, compel the air to travel directly against the tubes 11, these confined thin annular sheets or tubes of moving air absorbing heat from the tubes 11 and also, but in less degree, from the tubes 15. The lower ends of the tubes 15 are fastened within the apertures in the partition or diaphragm 14, and the upper ends of the tubes 15 are depressed inwardly at several points, as shown in Fig. 5, to form lugs 18 engaging the exterior walls of the tubes 11, thereby centering the upper ends of the tubes 15 with respect to the tubes 11.

Immediately below the partition or diaphragm 14 the shell 10 is provided with inlet openings 19, preferably four in number and located at equi-distant points, for the admission of the air under pressure, the air thus entering the heater below the partition 14 and having its only outlet in the restricted annular chambers between the tubes 11, 15. The air supplied through the openings 19 is led thereto from air-compressors 47 by means of pipes 48, the air being compressed by means of power supplied by the engine shown, whose cylinders are numbered 49.

Below the diaphragm or partition 14 and also below the inlets 19 for the air to be heated, I provide a horizontal partition 20 which is apertured to permit the passage through the same of the flues or tubes 11, but around its apertures is slightly separated from the exterior walls of said tubes, as clearly illustrated in Figs. 1 and 3.

The chamber within the casing or shell 10 and below the partition 20 may be designated as a water and steam chamber, since within the lower portion of the heater and below the partition 20 I place a suitable quantity of water to protect the lower ends of the tubes 11 from being burned and also to enable the generation of a suitable quantity of steam for admixture with the air during the process of heating the same. The steam generated in the lower or water and steam chamber of the heater has not entirely free access to the air and can only reach the latter by its passage upwardly through the restricted apertures in the partition 20 or through the spaces formed by the loose fit of said apertures around the tubes 11. The water for the water and steam chamber, which is the chamber formed between the partition 20 and bottom 12 of the heater, may be supplied through an opening 30 in said bottom by means of a pipe 50 leading thereto from a pump 51 driven from the engine shaft and connected by a pipe 52 with a suitable source of water supply.

The heater thus comprises the heat conducting tubes 11, the tubes 15 for finely dividing the air into thin annular sheets and compelling the passage of the same against the tubes 11, the partition 14 forming above it a collecting chamber, and the partition 20 forming below it a chamber for water and steam and above it and below the partition 14 a middle chamber for the reception, at the several points, of the air to be treated and heated.

The heated air from the hot air chamber 17 escapes through an outlet pipe 21 whose lower end is below the upper ends of the tubes 15 and whose upper end is equipped with a valve casing 53 from which a pipe 54 leads to the chest of a double-acting engine.

The method of utilizing the heater hereinbefore described will be substantially understood from the description already presented. The heater will derive its heat from any suitable source, and for small engines I will utilize oil as the fuel for the heater, while in case of large stationary engines coal will be used as the proper fuel. Water having been introduced into the lower or water and steam chamber of the heater and the fire having been properly started below the heater; steam will be generated and passing through the pipe 54 under pressure to the steam chest of the engine will set the latter in motion. The compressors 47 will preferably be double-acting and operated from the engine and hence with every stroke of the engine a quantity of air will be drawn into the compressors from their lower ends and a quantity of the cold air will be forced, under pressure, through the several openings 19 and fill the middle or air chamber intermediate the partitions 14, 20, whence the air in thin annular sheets will pass upwardly through the annular chambers formed between the tubes 11, 15 and finally escape from the upper ends of said tubes 15 and fill the collecting chamber 17, whence the air may escape through the outlet 21. During the travel of the air upwardly between the tubes 11, 15 the steam generated in the lower part of the heater will pass upwardly through the restricted openings in the partition 20 and commingle and pass with the air upwardly through the annular chambers 16, this steam facilitating its flow and also imparting to the air the condition of greater heat conductivity, whereby the air may be enabled to more rapidly absorb heat from the tubes 11, 15.

There are several steps in the process described of treating and heating the air which are of great advantage, and the two principal ones relate to the subdivision of the cool air into numerous thin tubular streams and compelling said streams, under pressure, to move against the heated surfaces, and to the delivery to the air of a limited quantity of steam to increase the heat conductivity of the air and, in the present instance, facilitate the flow of the air over the heated surfaces of the tubes. In the employment of the heater it is also of advantage that a separate collecting chamber be provided for the heated air and steam, another chamber for the cool air and a third chamber for the water and steam, and a further advantage resides in the fact that the air is delivered into the cool air chamber through several inlets, whereby the cool air chamber becomes filled with the air and the latter becomes evenly distributed to the means by which the body of air is subdivided into thin tubular streams for passage against the heated surfaces. It should be noticed that the tubes 15 compel the air in thin tubular sheets to pass close against the tubes 11, said tubes 15 so confining the air in thin sheets against the surfaces of the tubes 11 that the air is compelled to absorb the heat from said tubes 11.

What I claim as my invention and desire to secure by Letters Patent, is:—

1. A heater for producing a motive fluid comprising an exterior shell or casing subdivided by partitions into three chambers, the lower being a water and steam chamber, the middle one an air receiving chamber and the upper a collecting chamber, said shell having numerous fire tubes extending through it, tubes encompassing but separated by a space from said fire tubes and open at their lower ends within said air chamber and at their upper ends within said collecting chamber, and a delivery pipe leading from said collecting chamber, said steam and air chambers being in communication with each other so as to permit the steam generated to enter said air chamber and mix with the air therein, combined with means for forcing air into said air chamber and compelling the mixed air and steam to travel through the spaces between said fire tubes and said encompassing tubes and enter said collecting chamber and leave the same through said delivery pipe; substantially as set forth.

2. A heater for producing a motive fluid comprising an exterior shell or casing subdivided by partitions into three chambers, the lower being a water and steam chamber, the middle one an air receiving chamber and the upper a collecting chamber, said shell having numerous fire tubes extending through it, tubes encompassing but separated by a space from said fire tubes and open at their lower ends within said air chamber and at their upper ends within said collecting chamber, and a delivery pipe leading from said collecting chamber, the partition between said steam and air chambers having holes in it through which the said fire tubes pass and which are slightly larger than the diameter of said tubes so as to permit the steam generated to pass through them into said air chamber and mix with the air therein, combined with means for forcing air through a series of inlets into said air chamber and compelling the mixed air and steam to travel through the spaces between said fire tubes and said encompassing tubes and enter said collecting chamber and leave the same through said delivery pipe; substantially as set forth.

3. A heater for producing a motive fluid comprising an exterior shell or casing subdivided by partitions into three chambers, the lower being a water and steam chamber, the middle one an air receiving chamber and the upper a collecting chamber, said shell having numerous fire tubes extending through it, tubes encompassing but separated by a space from said fire tubes and open at their lower ends within said air chamber and at their upper ends within said collecting chamber, and a delivery pipe leading from said collecting chamber, the partition between said steam and air chambers having numerous passages through it for the steam to enter said air chamber and mix with the air therein, combined with means for forcing air through a series of inlets into said air chamber and compelling the mixed air and steam to travel through the spaces between said fire tubes and said encompassing tubes and enter said collecting chamber and leave the same through said delivery pipe; substantially as set forth.

4. A heater for producing a motive fluid comprising an exterior shell or casing subdivided into an air receiving chamber and a collecting chamber and having numerous fire tubes extending through it, tubes encompassing but separated by spaces from said fire tubes and open at their lower ends within said air chamber and at their upper ends within said collecting chamber, and a delivery pipe leading from said collecting chamber, combined with means for generating steam and delivering the same to said air chamber, and means for driving air under pressure into said air chamber and compelling the mixed air and steam to travel through the spaces between said fire tubes and said encompassing tubes and enter said collecting chamber and leave the same through said delivery pipe; substantially as set forth.

Signed at New York city, in the county of New York and State of New York this 7th day of July A. D. 1905.

GUSTAF EMIL HESSE.

Witnesses:
CHAS. C. GILL,
ARTHUR MARION.